United States Patent
Matsubara et al.

(10) Patent No.: US 8,048,331 B2
(45) Date of Patent: Nov. 1, 2011

(54) ETCHING COMPOSITION AND ETCHING PROCESS

(75) Inventors: Masahide Matsubara, Chiba (JP); Taketo Maruyama, Chiba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 12/943,639

(22) Filed: Nov. 10, 2010

(65) Prior Publication Data

US 2011/0049088 A1  Mar. 3, 2011

Related U.S. Application Data

(62) Division of application No. 11/752,966, filed on May 24, 2007, now abandoned.

(30) Foreign Application Priority Data

May 25, 2006  (JP) .................. 2006-145440

(51) Int. Cl.
- *B44C 1/22* (2006.01)
- *C03C 15/00* (2006.01)
- *C03C 25/68* (2006.01)
- *C23F 1/00* (2006.01)
- *C25F 3/00* (2006.01)

(52) U.S. Cl. .................. 216/101; 216/96; 216/108

(58) Field of Classification Search .............. 216/101, 216/108

See application file for complete search history.

(56) References Cited

U.S. PATENT DOCUMENTS

| 4,517,106 | A | 5/1985 | Hopkins et al. |
| 4,620,934 | A | 11/1986 | Hopkins et al. |
| 6,828,289 | B2 | 12/2004 | Peters et al. |
| 2002/0055447 | A1 | 5/2002 | Ishikawa et al. |
| 2003/0168431 | A1 | 9/2003 | Lee et al. |
| 2004/0262569 | A1 | 12/2004 | Cho et al. |

FOREIGN PATENT DOCUMENTS

| EP | 1187225 | 3/2002 |
| JP | 08-330692 | 12/1996 |
| JP | 2000-309888 | 11/2000 |
| JP | 3258780 | 12/2001 |
| JP | 2002-164332 | 6/2002 |
| JP | 3345408 | 8/2002 |

OTHER PUBLICATIONS

Extended European Search Report dated Dec. 1, 2008, for EP Application No. 07 10 8809.

*Primary Examiner* — Roberts Culbert

(74) *Attorney, Agent, or Firm* — Antonelli, Terry, Stout & Kraus, LLP.

(57) ABSTRACT

An etching composition which comprises at least one organic carboxylic acid compound selected from acetic acid, propionic acid, butyric acid, succinic acid, citric acid, lactic acid, malic acid, tartaric acid, malonic acid, maleic acid, glutaric acid, aconitic acid, 1,2,3-propanetricarboxylic acid and ammonium salts of these acids, a polysulfonic acid compound and water, and an etching process which comprises etching a conductive film comprising zinc oxide as the main component using the etching composition described above.

7 Claims, 1 Drawing Sheet

ETCHING COMPOSITION AND ETCHING PROCESS

BACKGROUND OF THE INVENTION

This application is a Divisional application of application Ser. No. 11/752,966, filed May 24, 2007, now ABN, the contents of which are incorporated herein by reference in their entirety.

1. Field of the Invention

The present invention relates to an etching composition used for etching conductive films which comprises zinc oxide as the main component and are used for display devices such as liquid crystal displays (LCD) and electroluminescence displays and to an etching process using the etching composition.

2. Description of the Related Art

As the conductive film for display devices such as liquid crystal displays and electroluminescence displays, films of indium tin oxide (ITO) and films of indium zinc oxide (IZO) are widely used. Due to the decrease in the resources for indium, electrically conductive materials which can be used in place of ITO and IZO have been developed.

Conductive films containing zinc oxide as the main component are widely used as the Piezoelectric thin films, optical waveguide films and gas sensitive films and are expected as the material which can be used in place of conventional conductive films for display devices. The conductive film containing zinc oxide as the main component can be supplied at a lower price with greater stability than indium-based conductive films since zinc is used as the raw material. Aluminum and gallium are often added to the zinc oxide films for display devices to decrease electric resistance.

The above conductive films are formed on a substrate such as a glass substrate in accordance with a process for film formation such as the sputtering process and the ion plating process. Then, etching is conducted using a resist or the like as the mask, and an electrode pattern is formed. The etching process includes wet processes and dry processes. An etching composition is used in the wet processes.

It is widely known that zinc oxide is soluble in acids and alkalis. When a transparent electrode of a display device such as a liquid crystal display is formed, the following properties are required for the etching composition:

(1) A great accuracy of working
(2) A suppressed amount of residues of etching
(3) A suitable etching rate
(4) A suppressed change in the etching property with dissolution of zinc oxide
(5) No corrosion of materials such as wiring materials The related arts will be described more specifically with reference to Figures. FIG. 1 shows a sectional view of a laminate which is obtained by forming a zinc oxide film 2 on a glass substrate 1, followed by forming a resist 3 patterned in accordance with the photolithography. FIG. 2 shows a sectional view of a laminate obtained after etching the laminate shown in FIG. 1 using the resist 3 as the mask. The great accuracy means that the zinc oxide film is etched accurately to give the dimensions shown by the resist pattern. It is preferable that the distance from the end portion of the resist (a) to the end portion of zinc oxide (b) (the amount of the side etching) is decreased as much as possible.

Residues 4 left remaining after the etching cause formation of the leak current between the electrodes when the residues have the electric conductivity. The residues 4 may cause a decrease in adhesion with a film formed above the zinc oxide film 2. Therefore, the presence of the residues is not preferable.

An excessively great etching rate is not preferable since the control of the etching becomes difficult. An etching rate of about 500 to 2,000 angstrom/min is preferable.

The concentration of zinc in the etching composition increases with the progress of the etching. Therefore, it is very important for etching of transparent electrodes in the industrial production that the etching composition is a stable fluid having the etching properties such as the etching rate hardly affected by the concentration of zinc in the etching composition. When the stable etching composition having the etching properties hardly affected by the concentration of zinc is used, the amount of etching of zinc oxide can be further increased.

In Japanese Patent Application Laid-Open No. 8(1996)-330692, a process for forming an electrode pattern for display devices containing zinc oxide as the main component is described. It is described that etching can be conducted with excellent accuracy without formation of residues by the etching using hydrochloric acid or nitric acid as an acidic solution of 0.005 to 0.2 N. However, when the above etching composition is actually used, the accuracy is insufficient due to a great amount of the side etching, and residues are formed. Moreover, the etching rate changes to a great degree due to the change in the concentration of the acid caused by vaporization of water and dissolution of zinc during the etching, and the stable etching cannot be expected.

In Japanese Patent No. 3258780, an electroluminescence element for displays and a process for producing the element are described. It is described that a transparent conductive film can be formed by etching a zinc oxide film with acetic acid. Although the etching of a zinc oxide film with an aqueous solution of acetic acid can be conducted, this process is not preferable due to the formation of residues.

In Japanese Patent No. 3345408, an etching composition for transparent electrodes comprising oxalic acid and a polysulfonic acid compound is disclosed. This composition relates to ITO films, and no descriptions on the etching of a zinc oxide film can be found at all. When a zinc oxide film is etched with an aqueous solution of oxalic acid, hardly soluble crystals of zinc oxalate are formed on the substrate and, therefore, this process is not preferable. Even when a polysulfonic acid compound is added to the aqueous solution of oxalic acid, crystals of zinc oxalate cannot be removed by etching.

In Solid-State Sensor Actuator Workshop (New York: IEEE, 1992 pp 41-45), it is reported that the etching can be conducted at a suitable etching rate when ammonium chloride is used in the etching. However, etching residues are formed, and this process cannot be used.

SUMMARY OF THE INVENTION

The present invention relates to an etching composition which forms almost no residues, enables to conduct the etching at a suitable etching rate and exhibits a suppressed change in the etching properties when a zinc oxide film containing zinc oxide as the main component is etched and an etching process using the composition.

As the result of intensive studies by the present inventors, the present invention has been completed as shown in the following.

The present invention provides an etching composition which contains at least one organic carboxylic acid compound selected from acetic acid, propionic acid, butyric acid, succinic acid, citric acid, lactic acid, malic acid, tartaric acid, malonic acid, maleic acid, glutaric acid, aconitic acid, 1,2,3-propanetricarboxylic acid and ammonium salts of these acids, a polysulfonic acid compound, and water.

The present invention also provides an etching process which contains etching a conductive film containing zinc oxide as a main component using an etching composition described above.

DETAILED DESCRIPTION OF THE INVENTION

Figure 1:
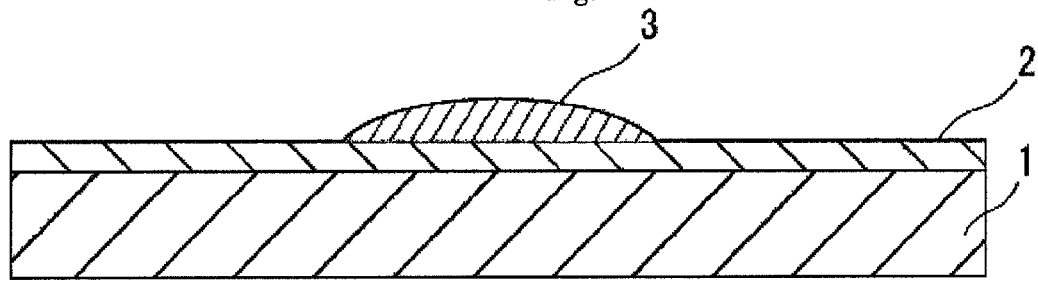
FIG. 1 shows a schematic sectional view of a laminate in which a patterned resist is formed.
Figure 2:
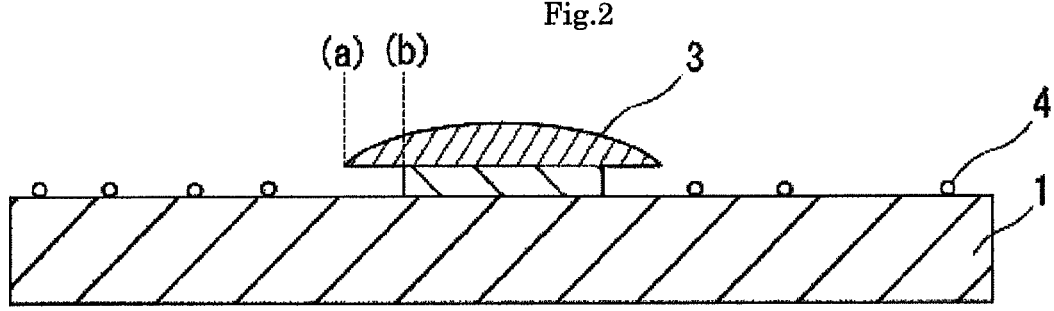
FIG. 2 shows a schematic sectional view of a laminate obtained after etching the laminate shown in FIG. 1.

The etching composition will be described in the following.

The etching composition of the present invention comprises an organic carboxylic acid compound comprising an organic carboxylic acid and/or an ammonium salt of an organic carboxylic acid, a polysulfonic acid compound, and water.

The organic carboxylic acid compound is at least one compound selected from acetic acid, propionic acid, butyric acid, succinic acid, citric acid, lactic acid, malic acid, tartaric acid, malonic acid, maleic acid, glutaric acid, aconitic acid, 1,2,3-propanetricarboxylic acid, and ammonium salts of these acids. Among the above organic carboxylic acid compounds, acetic acid, citric acid, succinic acid, lactic acid, malic acid, tartaric acid and ammonium salts thereof are preferable, and acetic acid and ammonium acetate are more preferable.

It is preferable that the concentration of the organic carboxylic acid compound comprised in the etching composition of the present invention is 0.1 to 90% by weight, more preferably 0.2 to 80% by weight and most preferably 0.3 to 70% by weight. When the concentration is 0.1 to 90% by weight, the stable etching operation can be conducted while a practically sufficient etching rate is maintained.

It is preferable that the concentration of the ammonium salt of an organic carboxylic acid compound is 3.0 to 90% by weight, more preferably 4.0 to 80% by weight and most preferably 5.0 to 70% by weight. When the concentration is 3.0 to 90% by weight, the stable etching operation can be conducted while a practically sufficient etching rate is maintained.

The polysulfonic acid compound comprised in the etching composition of the present invention is a compound selected from condensation products of naphthalenesulfonic acid with formaline (which is preferably a compound obtained by sulfonation using naphthalene and sulfuric acid, followed by condensation by addition of formaline or by condensation by addition of formaline and neutralization with an alkali), ligninsulfonic acid, polystyrenesulfonic acid and alkali salts of these compounds.

The condensation product of naphthalenesulfonic acid with formaline is available as a commercial product, examples of which include DEMOL N (a trade name; manufactured by KAO Co., Ltd.), LAVELIN FP (a trade name; manufactured by DAIICHI KOGYO SEIYAKU Co., Ltd.) and POLITY N100K (a trade name; manufactured by LION Co., Ltd.).

The ligninsulfonic acid is available as a commercial product, examples of which include SAN-X (a trade name; manufactured by NIPPON SEISHI CHEMICAL Co., Ltd.). When the polysulfonic acid compound contains a metal such as sodium, the compound is not suitable for the use in the electronic industry. The compound can be used after sodium is removed by the treatment with an ion exchange resin.

It is preferable that the concentration of the polysulfonic acid compound is in the range of 0.0001 to 10% by weight. When the concentration is in the range of 0.001 to 10% by weight, the effect of removing residues after the etching can be sufficiently exhibited. The above concentration is more preferably 0.001 to 8% by weight and most preferably 0.01 to 1% by weight.

The etching composition of the present invention may be used after pH is adjusted at a desired value by adding an acid or an alkali. It is preferable that pH is 2 to 9. When pH is in this range, corrosion of aluminum used as the wiring material can be prevented. pH is more preferably 3 to 8 and most preferably 3 to 7.

The etching composition of the present invention can be prepared by mixing the above materials and water in the prescribed amounts. The content of each material can be adjusted within the desired range by suitably adjusting the amount of water.

The etching process will be described in the following.

The etching process of the present invention comprises etching a conductive film comprising zinc oxide as the main component using the etching composition of the present invention.

The conductive film used for the etching in accordance with the process of the present invention is not particularly limited as long as the film comprises zinc oxide as the main component. The film may comprise one or a plurality of types of metals other than zinc. In particular, it is preferable that the film comprises at least one of aluminum and gallium since the electric resistance is decreased. Zinc oxide is the main component when the content of zinc oxide in the conductive film is the greatest among the components of the conductive film.

It is preferable that the etching composition of the present invention is used in the condition of a temperature in the range of the room temperature to 80° C., more preferably in the range of the room temperature to 70° C. and most preferably in the range of the room temperature to 60° C. The time for etching the zinc oxide film with the etching composition can be suitably set with consideration on the etching rate (about 500 to 2,000 angstrom/min) suitable for the thickness of the treated film and the temperature of the treatment.

The procedures in the etching process of the present invention are not particularly limited as long as the above etching composition can be uniformly brought at the position for the etching by circulation, and any of the dipping process and the shower process can be used. When the dipping process is used, the procedures are not particularly limited as long as the etching composition on the substrate can be replaced, and the process in which the etching composition is made flow down on the inclined substrate, the process in which the substrate itself is shaken (the dipping process with shaking) or the process in which the etching composition is stirred in a tank can be used. The shower pressure in the shower process and the method of shaking in the dipping process with shaking can be suitably decided with consideration on the properties of the fluid.

EXAMPLES

The present invention will be described more specifically with reference to Examples and Comparative Examples in the following. However, the present invention is not limited to the examples.

Examples 1 to 16 and Comparative Examples 1 to 8

A zinc oxide film (the thickness: 1,000 angstrom) containing 3% by atom of gallium was formed on a glass substrate in accordance with the sputtering process. A resist pattern was formed on the zinc oxide film in accordance with the photolithography. By using an etching composition shown below in Table 1 or an etching composition obtained by adding 0.1% by weight of zinc oxide to an etching composition shown in Table 1, the etching treatment was conducted under the following condition. The rest of the etching composition was water.

Temperature of the substrate: 30° C.

Procedure of the treatment: The substrate was dipped into the etching composition while the substrate was shaken (the dipping process with shaking).

Time of dipping: The time twice at the time required for the etching (the just-etching time)

The substrate treated by the etching was cleaned with water and dried by blowing nitrogen gas. The etching rate and the condition of residues were examined on the substrate treated by the etching. The results are shown in Table 2.

The etching rate was obtained by dividing the thickness of the zinc oxide film (1,000 angstrom) with the just-etching time. The presence or the absence of residues was examined by observation using a scanning electron microscope (SEM).

"Residues after etching" in table 2 shows the result obtained with the composition before adding 0.1% by weight of zinc oxide. The result obtained with the composition after adding 0.1% by weight of zinc oxide was the same as the result obtained with the composition before adding 0.1% by weight of zinc oxide.

TABLE 1

| | Composition | |
|---|---|---|
| Example 1 | 1% by wt. acetic acid | 0.1% by wt. LAVELIN FP |
| Example 2 | 5% by wt. acetic acid | 0.0001% by wt. LAVELIN FP |
| Example 3 | 5% by wt. acetic acid | 0.1% by wt. LAVELIN FP |
| Example 4 | 5% by wt. acetic acid | 1% by wt. LAVELIN FP |
| Example 5 | 5% by wt. acetic acid | 0.1% by wt. sodium ligninsulfonate |
| Example 6 | 5% by wt. acetic acid | 0.1% by wt. sodium polystyrenesulfonate |
| Example 7 | 5% by wt. citric acid | 0.1% by wt. LAVELIN FP |
| Example 8 | 5% by wt. succinic acid | 0.1% by wt. LAVELIN FP |
| Example 9 | 5% by wt. lactic acid | 10.0% by wt. LAVELIN FP |
| Example 10 | 5% by wt. malic acid | 0.1% by wt. LAVELIN FP |
| Example 11 | 5% by wt. tartaric acid | 0.1% by wt. LAVELIN FP |
| Example 12 | 15% by wt. ammonium acetate | 0.1% by wt. DEMOL N |
| Example 13 | 15% by wt. ammonium acetate | 0.1% by wt. POLITY N100K |
| Example 14 | 15% by wt. ammonium succinate | 0.1% by wt. LAVELIN FP |
| Example 15 | 15% ammonium acetate 5% by wt. acetic acid | 0.1% by wt. LAVELIN FP |
| Comparative Example 1 | 15% by wt. acetic acid | |
| Comparative Example 2 | 15% by wt. ammonium acetate | |
| Comparative Example 3 | 5% by wt. succinic acid | |
| Comparative Example 4 | 0.1% by wt. hydrochloric acid | |
| Comparative Example 5 | 5% by wt. acetic acid | |
| Comparative Example 6 | 1% by wt. LAVELIN FP | |
| Comparative Example 7 | 1% by wt. LAVELIN FP (sodium removed) | |
| Comparative Example 8 | 0.5% by wt. LAVELIN FP (sodium removed) | |

LAVELIN FP: A condensation product of naphthalenesulfonic acid with formaline (a compound obtained by sulfonation using naphthalene and sulfuric acid, followed by condensation by addition of formaline and neutralization; the molecular weight: 2,000~5,000; manufactured by DAIICHI KOGYO SEIYAKU Co., Ltd.)
DEMOL N: A condensation product of naphthalenesulfonic acid with formaline (manufactured by KAO Co., Ltd.)
POLITY N100K A condensation product of naphthalenesulfonic acid with formaline (manufactured by LION Co., Ltd.)

TABLE 2

| | Etching rate (Å/min) content of zinc oxide (by wt.) | | Residues of etching |
|---|---|---|---|
| | 0 | 0.1 | |
| Example 1 | 1091 | 857 | excellent |
| Example 2 | 857 | 857 | excellent |
| Example 3 | 1333 | 1200 | excellent |
| Example 4 | 2000 | 1714 | excellent |
| Example 5 | 1333 | 1200 | excellent |
| Example 6 | 1333 | 1200 | excellent |
| Example 7 | 750 | 706 | excellent |
| Example 8 | 1200 | 1200 | excellent |
| Example 9 | 1333 | 1200 | excellent |
| Example 10 | 632 | 600 | excellent |

TABLE 2-continued

| | Etching rate (Å/min) content of zinc oxide (by wt.) | | Residues of etching |
|---|---|---|---|
| | 0 | 0.1 | |
| Example 11 | 667 | 632 | excellent |
| Example 12 | 1091 | 1000 | excellent |
| Example 13 | 1091 | 1000 | excellent |
| Example 14 | 750 | 706 | excellent |
| Example 15 | 2000 | 2000 | excellent |
| Comparative Example 1 | 2000 | 2000 | poor |
| Comparative Example 2 | 857 | <200 | poor |
| Comparative Example 3 | 1500 | 1500 | poor |
| Comparative Example 4 | 6000 | 2400 | poor |
| Comparative Example 5 | 2000 | 2000 | poor |
| Comparative Example 6 | <300 | etching not possible | examination not possible |
| Comparative Example 7 | 6000 | 545 | excellent |
| Comparative Example 8 | 2000 | etching not possible | excellent |

Figure 3:
FIG. 3 shows an image of the surface by the SEM observation after being etched in Example 2 (the etching composition before adding 0.1% by weight of zinc oxide).
Figure 4:
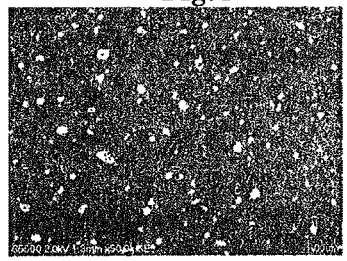
FIG. 4 shows an image of the surface by the SEM observation after being etched in Comparative Example 5 (the etching composition before adding 0.1% by weight of zinc oxide).

Evaluation of residues
poor: many residues on the entire surface
excellent: no residues at all Images of the surface by the SEM observation after being etched in Example 2 and Comparative Example 5 (both are the etching composition before adding 0.1% by weight of zinc oxide) are shown in FIG. 3 and FIG. 4, respectively. As shown in FIG. 3, the etching composition used in Example 2 formed no residues of etching. In contrast, the etching composition used in Comparative Example 5 formed many white dots of residues of etching as shown in FIG. 4.

It is shown by the results in Tables 1 and 2 that, when the etching composition of the present invention is used, the conductive film comprising zinc oxide as the main component can be etched at a suitable etching rate which is easy for the control, and the formation of residues of etching is suppressed.

The decrease in the etching rate is small and the change in the etching properties is suppressed even when zinc oxide is dissolved. Therefore, it is shown that the etching composition of the present invention exhibits the excellent properties as the etching composition used in the industrial production.

What is claimed is:

1. An etching process with comprises etching a conductive film comprising zinc oxide as a main component using an etching composition, said etching composition comprising a polysulfonic acid compound, water, and at least one organic carboxylic acid compound selected from the group consisting of acetic acid, propionic acid, butyric acid, succinic acid, citric acid, lactic acid, malic acid, tartaric acid, malonic acid, maleic acid, glutaric acid, aconitic acid, 1,2,3-propanetricarboxylic acid and ammonium salts of these acids.

2. The etching process according to claim 1, wherein a concentration of the polysulfonic acid compound is 0.0001 to 10% by weight.

3. The etching process according to claim 1, wherein the conductive film also comprises at least one of aluminum and gallium.

4. The etching process according to claim 1, wherein the organic carboxylic acid compound is selected from the group consisting of acetic acid, citric acid, succinic acid, lactic acid, malic acid and tartaric acid, and ammonium salts thereof.

5. The etching process according to claim 1, wherein the ammonium salt is selected from the group consisting of ammonium acetate and ammonium succinate.

6. The etching process according to claim 1, wherein the polysulfonic acid compound is a compound selected from the group consisting of condensation products of naphthalenesulfonic acid with formalin, ligninsulfonic acid, polystyrenesulfonic acid and salts of these compounds.

7. The etching process according to claim 6, wherein the condensation product of naphthalenesulfonic acid with formalin is a compound obtained by sulfonation using naphthalene and sulfuric acid, followed by condensation by addition of formalin or by condensation by addition of formalin and neutralization with an alkali.

* * * * *